United States Patent [19]

Morizumi et al.

[11] Patent Number: 4,500,184

[45] Date of Patent: Feb. 19, 1985

[54] ELECTRONIC FLASH CAMERA

[75] Inventors: Masaaki Morizumi; Toru Kando; Keisuke Haraguchi, all of Tokyo, Japan

[73] Assignee: Asahi Kogaku Kogyo Kabushiki Kaisha, Tokyo, Japan

[21] Appl. No.: 476,796

[22] Filed: Mar. 18, 1983

[30] Foreign Application Priority Data

Apr. 19, 1982 [JP] Japan .............................. 57-55652[U]

[51] Int. Cl.³ ............................................. G03B 15/05
[52] U.S. Cl. ............................................... 354/149.11
[58] Field of Search ................ 354/126, 145.1, 149.11, 354/187

[56] References Cited

U.S. PATENT DOCUMENTS 4,181,415  1/1980  Uchiyama et al. ......... 354/149.11 X
4,189,222  2/1980  Maitani .............................. 354/126
4,299,465 11/1981  Chan ............................... 354/187 X Primary Examiner—John Gonzales
Attorney, Agent, or Firm—Fleit, Jacobson, Cohn & Price

[57] ABSTRACT

An electronic flash camera, in which a power source switch for an electronic flash unit contained in the camera is interlocked to the operation of opening and closing a cover of the front of an optical system of the camera such that said power source switch is turned off when resetting said electronic flash unit and/or when closing said cover.

3 Claims, 3 Drawing Figures

ELECTRONIC FLASH CAMERA

BACKGROUND OF THE INVENTION

1. Field of the Invention

This invention relates to an electronic flash camera and, more particularly, to an electronic flash camera, in which a power source switch for operating an electronic flash unit is interlocked to the operation of closing a cover of the front of an optical system and/or the operation of setting an electronic flash unit.

2. Description of the Prior Art

In the prior art electronic flash camera, a cover at the front of an optical system and an electronic flash unit are not directly interlocked to each other, so that it is liable that the power source switch remains "on" when the cover is closed.

Photographic flashing is generally produced by making use of energy released when a high capacitance capacitor is discharged. The flashing may be produced at least when a cover of an optical system is opened at the time of photographing. That is, the power source unit need not be "on" while the cover is closed. Rather, if the power source switch is held "on" while no photograph is taken, it leads to wasteful power consumption of the power source battery, so it must be avoided.

SUMMARY OF THE INVENTION

The present invention has an object of solving the problem noted above in the prior art by interlocking the cover at the front of the optical system and the power source switch for operating the electronic flash unit such that the power source switch is held "off" while no photograph is taken.

The above-mentioned and an object and features of the invention will become apparent from the following detailed description taken in conjunction with the drawings which indicate an embodiment of the invention.

BRIEF DESCRIPTION OF THE DRAWINGS

FIGS. 1 to 3 show an embodiment of the invention, in which

FIG. 1 is a front view showing the front of a camera with a cover closed and an electronic flash unit in a reset state;

FIG. 2 is a front view showing the front of the same camera with the cover opened and the electronic flash unit in a set state; and FIG. 3 is a fragmentary perspective view showing part of the same camera with the cover opened and the electronic flash unit in the reset state.

DETAILED DESCRIPTION OF PREFERRED EMBODIMENTS

Figure 1:
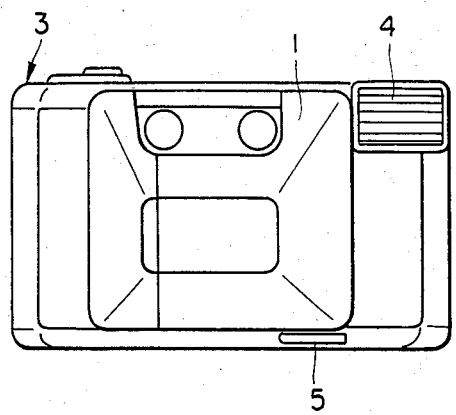
Figure 2:
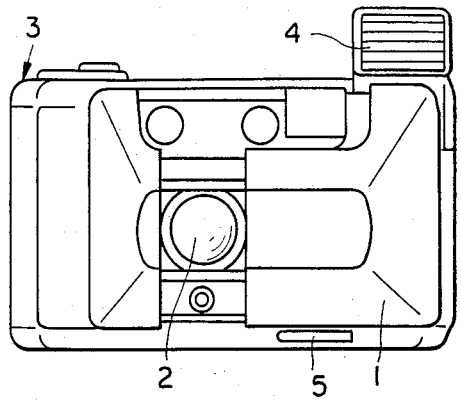
Figure 3:
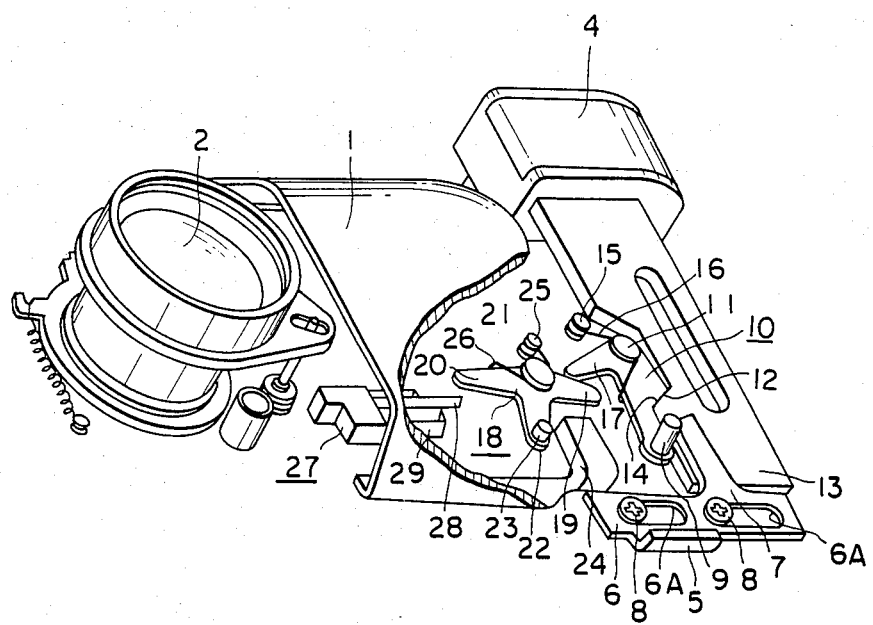

FIGS. 1 to 3 show an embodiment of the present invention. Referring to the Figures, reference numeral 1 designates a cover, which covers the front of a lens 2 constituting part of an optical system of a camera. The cover 1 is hinged to the front of a camera frame 3 such that it can be freely opened and closed. An electronic flash unit 4 is provided on the camera frame 3 such that it is slidable in a direction (i.e., vertical direction in FIG. 1) at right angles to the direction of opening and closing the cover 1 (i.e., in the transversal direction in FIG. 1). The camera frame 3 is further provided with a slide knob 5. The slide knob has a stem portion 6 and an operating portion 7 integral with each other. The stem portion 6 is formed with a pair of guide slots 6A. Guide pins 8 secured to the camera frame 3 penetrate the slots 6A. The stem portion 6 is spring biased in a fixed direction (i.e., in the rightward direction in FIG. 3) by a spring (not shown) stretched between it and the camera frame 3.

The operating portion 7 is adapted to engage a lock plate rotating pin 9 projecting from one end of a lock plate 10. The lock plate 10 is rotatable about a pin 11 projecting from the camera frame 3. The lock plate 10 has a lock portion 12 formed between the pin 11 and rotating pin 9. The lock portion 12 can be received in a recess 14 formed in a stem portion 13 of the electronic flash unit 4. The electronic flash unit 4 is spring biased in the upward direction by a spring (not shown), which is stretched between the stem portion 13 and the camera frame 3.

A biasing spring 16 which is passed round the pin 11 is coupled between the lock plate 10 and a pin 15 projecting from the camera frame 3. The lock plate 10 is formed at the other end with a lock pawl 17. The lock pawl 17 is adapted to engage an engagement portion 19 of a substantially T-shaped rotary member 18. The rotary member 18 has a switch engagement portion 20 formed on the side opposite the engaging portion 19. The rotary member 18 is rotatable about a pin 21 projecting from the camera frame 3. The rotary member 18 further has an intermediate portion 22, and an engagement pin 23 projects from the intermediate portion 22. The engagement pin 23 is adapted to be in contact with an urging projection 24 extending inside the cover 1. A biasing spring 26 which is passed round the pin 21 is coupled between the rotary member 18 and a lock pin 25 projecting from the camera frame 3. The rotary member 18 is biased by the spring 26 in the counterclockwise direction. The lock plate 10 is biased by the spring 16 also in the counterclockwise direction.

The switch engagement portion 20 of the rotary member 18 is adapted to engage a movable contact 28 of a power source switch 27, which is secured to the camera frame 3 and can operate en electronic flash circuit (not shown). The power source switch 27 consists of the movable contact 28, which is an elastic member, and a fixed contact 29. When the movable contact 28 is urged by the switch engagement portion 20 into contact with the fixed contact 29, the power source switch 27 is turned on.

The operation of the above construction will now be described.

FIG. 3 shows a portion of the camera with the cover 1 opened and with the electronic flash unit in a reset state. This state of the camera is one before photographing. In this state, the power source switch 27 is "off", with the switch engagement portion 20 of the rotary member 18 in a position, at which no urging force is applied to the movable contact 28. When the slide knob 5 is pushed to the left from this state, the operating portion 7 integral with the slide knob 5 pushes the rotating pin 9 of the lock plate 10, whereby the lock plate 10 is rotated in the clockwise direction against the biasing force of the biasing spring 16.

With the rotation of the lock plate 10 in the clockwise direction, the urging force of the lock pawl 17 exerted to the engaging portion 19 is reduced so that the rotary member is rotated in the counterclockwise direction by the biasing force of the biasing spring 26. Further, with the rotation of the lock plate 10 the engagement between the lock portion 12 and the recess 14 of the stem portion 13 of the electronic flash unit is released, so that the stem portion 13, i.e., the electronic flash unit 4, is moved upwardly. Thus, the electronic flash unit is set. Meanwhile, with the rotation of the rotary member 18 in the counterclockwise direction the movable contact 28 of the power source switch 27 is urged by the switch engagement portion 20 into contact with the fixed contact 29, thus turning on the power source switch 27.

When the cover 1 is subsequently closed to cover the lens 2 with the electronic flash unit in the set state, that is, with the subsequent closing action of the cover 1 (in the leftward direction in the Figure), the engagement pin 23 of the rotary member 18 is urged by the urging projection 24 so that it is rotated in the clockwise direction against the biasing force of the biasing spring 16. The switch engagement portion 20 is thus moved away from the movable contact 28 to release the contact between the movable contact 28 and fixed contact 29. The power source switch 27 is thus turned off.

When the electronic flash unit 4 is pushed down from its set state with the cover 1 in the open state, the intermediate portion 12 of the lock plate 10 is engaged in the recess 14 of the stem portion 13 of the electronic flash unit. At the time of this engagement, the lock plate 10 is rotated in the counterclockwise direction. Thus, the switch engagement portion 20 is moved in the direction away from the movable contact 28 to turn off the power source switch 27.

As has been shown above, the power source switch 27 is always turned off when resetting the electronic flash unit and/or closing the cover 1.

As has been described in the foregoing, with the electronic flash unit according to the invention the power source switch for operating the electronic flash unit is operated in an interlocked relation to the operation of opening and closing the camera cover and also the operation of setting the electronic flash unit, and the power source switch can be turned off when closing the cover and/or resetting the electronic flash unit. Thus, it is possible to avoid wasteful consumption of the power source battery. In addition, the operation of opening and closing the cover and the operation of setting the electronic flash unit are both one-touch operations, so that the power source switch can be turned on and off very easily.

What is claimed is:
1. An electric flash camera comprising:
a camera frame;
an electric flash unit movably mounted on the camera frame between an extended set position and a retracted reset position;
a lens cover movably mounted on the camera frame between an open position for exposing a camera lens and a closed position for covering the camera lens;
a power source switch positionable in an on position and an off position for controlling the electronic flash unit;
means for turning on and off the power source switch controlled by the movement of the electronic flash unit and the lens cover, the means for turning on and off the power source switch turns off the power source switch when the lens cover is in the closed position and the electronic flash unit is in the extended set position, the means for turning on and off the power source switch turns off the power source switch when the electronic flash unit is in the retracted reset position and the means for turning on and off the power source switch turns on the power source switch when the electronic flash unit is in the extended set position and the lens cover is in the open position.

2. An electronic flash camera as defined in claim 1, wherein the power source switch is biased to the off position and the means for turning on and off the power switch includes a rotatable member biased towards the power source switch, the rotatable member being moved away from the power source switch, thereby turning off the power source switch when the lens cover is in the closed position and the electronic flash unit is in the extended set position and thereby turning off the power source switch when the electronic flash unit is in the retracted set position and the rotatable member being biased toward the power source switch, thereby turning on the power source switch when the electronic flash unit is in the extended set position and the lens cover is in the open position.

3. An electronic flash unit as defined in claim 1, wherein the lens cover is movable relative to the frame in a direction perpendicular to the direction of movement of the electronic flash unit relative to the frame.

* * * * *